(12) United States Patent
Lin et al.

(10) Patent No.: US 6,291,381 B1
(45) Date of Patent: Sep. 18, 2001

(54) CATALYTIC REFORMING CATALYST ACTIVATION

(75) Inventors: Fan-Nan Lin, Bartlesville, OK (US); Donald H. Macahan, Borger, TX (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/343,376

(22) Filed: Jun. 30, 1999

(51) Int. Cl.[7] .............................. B01J 20/34; B01J 38/42; B01J 38/10; B01J 23/00; B01J 23/40
(52) U.S. Cl. .............................. 502/35; 502/53; 502/325; 502/326
(58) Field of Search .............................. 502/35, 53, 325, 502/326; 208/49, 62, 63, 134, 137, 139; 585/488, 489

(56) References Cited

U.S. PATENT DOCUMENTS

| | | | |
|---|---|---|---|
| 2,785,138 | 3/1957 | Milliken, Jr. | 252/415 |
| 2,785,139 | 3/1957 | Heinemann | 252/415 |
| 2,980,631 | 4/1961 | Craig et al. | 252/419 |
| 3,625,860 | 12/1971 | Condrasky et al. | 252/415 |
| 4,469,907 | * 9/1984 | Araki et al. | 585/259 |
| 4,891,346 | * 1/1990 | Hucul | 502/35 |
| 5,707,921 | * 1/1998 | Wu et al. | 502/334 |
| 5,817,227 | * 10/1998 | Mikitenko et al. | 208/143 |
| 5,888,355 | * 3/1999 | Mikitenko et al. | 203/DIG. 6 |
| 6,048,450 | * 4/2000 | Mikitenko et al. | 208/143 |

OTHER PUBLICATIONS

"Catalytic Reforming Process Technology" by Refining Process Services, Inc., Cheswick, PA, Title Pages and pp. 2, 15–16, and 19 of section 3, dated Jul. 18, 2000.

* cited by examiner

Primary Examiner—Steven P. Griffin
Assistant Examiner—Cam N. Nguyen
(74) Attorney, Agent, or Firm—Phillips Petroleum Company

(57) ABSTRACT

Catalyst activation of a platinum reforming catalyst system contained in a multiple reactor system by simultaneously reducing the catalyst with a sustained hydrogen flow through the multiple reactor system while introducing a nonmetallic chlorine-containing compound serially into each reactor of the multiple reactor system in an amount to add from about 0.05 to about 0.3 weight percent chlorine to the catalyst and thereafter purging the system with about 100 to about 50,000 cubic feet of hydrogen per cubic foot of catalyst prior to commencing use of the treated catalyst system for reforming hydrocarbon feed.

7 Claims, No Drawings

CATALYTIC REFORMING CATALYST ACTIVATION

This invention relates to the regeneration and activation of reforming catalyst and the use of such activated catalyst in the reforming of hydrocarbons.

BACKGROUND OF THE INVENTION

Catalytic reforming, or hydroforming, is a well established industrial process employed by the petroleum industry for improving the octane quality of naphthas or straight run gasolines. In reforming, a multi-functional catalyst is employed which typically contains a metal hydrogenation-dehydrogenation (hydrogen transfer) component or components, substantially atomically dispersed upon the surface of a porous inorganic oxide support, notably alumina.

In recent years, platinum has been widely commercially used as the metallic hydrogen transfer component of reforming catalysts, and platinum-on-alumina catalysts have been commercially employed in refineries. Also, additional metallic components, such as rhenium, iridium, ruthenium, tin, palladium, germanium and the like, have been added to platinum as promoters to further improve the activity, selectivity, or both, of the basic platinum catalyst.

In a conventional reforming process, a series of reactors constitute the heart of the reforming unit. Each reforming reactor is generally provided with a fixed bed or beds of the catalyst which receive upflow or downflow feed. Each reactor is provided with a heater because the reactions which take place therein are endothermic. In a conventional reforming process, a naphtha feed with hydrogen or hydrogen recycle gas is passed through a preheat furnace, then downward through a reactor, and then in sequence through subsequent interstage heaters and reactors of the series. The product of the last reactor is separated into a liquid fraction and a vaporous effluent. The vaporous effluent, a gas rich in hydrogen, is used as hydrogen recycle gas in the reforming process.

During operation, the activity of the reforming catalyst gradually declines due to the build-up of coke, and the temperature of the process is gradually raised to compensate for the activity loss caused by the coke deposits. Eventually, economics dictate the necessity of regenerating the catalyst.

The initial phase of catalyst regeneration is accomplished by burning the coke off the catalyst under controlled conditions. Catalyst regeneration is then completed through a sequence of activation steps wherein the agglomerated metal hydrogenation-dehydrogenation components are atomically redispersed. Such activation generally is achieved by treating the catalyst with hydrogen to effect reduction of the platinum oxide, and such other oxides as may be present in the catalyst system, followed by a chloride treatment of the reduced catalyst system prior to placing it back into use.

In addition to the activation process required when working with a catalyst which has been subjected to regeneration by burning off coke from the catalyst, there is generally carried out an activation treatment of the initially charged catalyst to the reactor prior to the introduction of hydrocarbon feed to the system.

In both the activation of fresh catalyst as well as the activation of a regenerated catalyst there have been numerous efforts to achieve a catalyst system whereby the catalyst will have increased activity, provide a product having increased octane values and avoid the undesirable cracking of product.

It is an object of the present invention to provide a process for the regeneration and activation of a platinum reforming catalyst.

Another object of the invention is to provide an improved system for the activation of a platinum reforming catalyst whereby the catalyst activity is increased.

A still further object of this invention is to provide an improved process for the activation of a platinum reforming catalyst which, when the activated catalyst is used in the reforming of a reformer feed, coke formation on the catalyst is reduced.

Yet another object of this invention is to provide a process for the activation of a platinum reforming catalyst which, when the activated catalyst is used in the reforming of a reformer feed, the cracking of such feed is decreased while the octane number of the reformer product is increased.

Other aspects, objects and the several advantages of the invention will be apparent from the following specification and appended claims.

SUMMARY OF THE INVENTION

In accordance with the present invention, an improved reforming catalyst is obtained when the catalyst, during reduction with hydrogen, is simultaneously contacted with hydrogen and a nonmetallic chlorine-containing compound in a reactor of a series of multiple reactors, and thereafter a hydrogen purge is maintained for a sufficient amount of time to expose the reforming catalyst to about 100 to about 50,000 cubic feet of hydrogen per cubic foot of catalyst prior to bringing the system to reforming conditions.

Thus, in accordance with one aspect of the present invention, there is provided a process for the activation of a platinum reforming catalyst contained in a multiple reaction zone system, said process comprises: (a) reducing the catalyst with hydrogen; (b) simultaneously with step (a) contacting the catalyst with a nonmetallic chlorine-containing compound by introducing the nonmetallic chlorine-containing compound serially into each reaction zone of the multiple reaction zone system under conditions to effect decomposition of the nonmetallic chlorine-containing compound; and (c) thereafter purging the resulting chlorine-treated catalyst with hydrogen for a period of time necessary to remove excess chlorine from the catalyst prior to the use of said chlorine-treated catalyst in a reforming process.

In accordance with another aspect of the present invention, there is provided an improved process for the regeneration of a platinum reforming catalyst contained in a multiple reaction zone system, said process comprises: (a) purging the multiple reaction zone system with nitrogen; (b) subjecting the deactivated catalyst to an oxidative burning off at a temperature and for a time sufficient to remove substantially all carbonaceous deposits thereon; (c) subjecting the substantially-carbon-free catalyst to an oxygen treatment for a period of time sufficient to effect the oxidation of metals contained in the substantially-carbon-free catalyst; (d) purging the resulting oxidized catalyst of molecular oxygen; (e) cooling the resulting purged catalyst; (f) reducing the dried catalyst by contacting with hydrogen which is introduced into a reaction zone of the multiple reaction zone system; (g) simultaneously with step (f) contacting the catalyst with a nonmetallic chlorine-containing compound by introducing the chlorine-containing compound serially into each reactor of the multiple reaction zone system; and (h) thereafter purging the resulting catalyst systems of steps (f) and (g) with hydrogen for a period of time necessary to remove excess chlorine from the catalyst prior to start up of the multiple reaction zone reforming system.

DETAILED DESCRIPTION OF THE INVENTION

In carrying out the process of the present invention there is employed a treatment of the catalyst beds of a reforming system which employs a series of reactors, generally three or four, which can contain varying catalyst compositions in each of the reactors. The individual reactors of the series can contain a platinum-alumina catalyst system either alone or in combination with an additional metallic compound such as rhenium, iridium, ruthenium, tin, palladium, germanium, and the like. It is presently preferred, in carrying out the regeneration and activation processes of this invention that a platinum-rhenium-alumina catalyst system be utilized in each reactor of the series.

The present invention is based upon the discovery that in carrying out the generally practiced procedure for regeneration of reforming catalyst contained in a series of reactors, wherein the deactivated catalyst is subjected to oxidation to remove carbonaceous deposits and thereafter activated through the addition of a chlorine-containing compound and hydrogen to the reactor system, or that fresh catalyst is to be activated with hydrogen and a chlorine-containing compound, that by introducing a nonmetallic chlorine-containing compound simultaneously with hydrogen to at least one of the reactors, preferably to only the first of the reactors of the series and thereafter purging the resulting activated catalyst system with from about 100 to about 50,000 cubic feet of hydrogen per cubic feet of catalyst there is achieved a suitably activated catalyst which, when placed in service in the reforming process, provides a system in which undesirable cracking of the feedstock decreases while octane number of the reforming process product and catalyst activity increases.

In accordance with this invention, a reforming catalyst containing a platinum metal is activated by simultaneously contacting the catalyst with hydrogen and a nonmetallic chlorine-containing compound, and thereafter purging the thus-treated catalyst with hydrogen.

An essential aspect of this invention is that the chloride treatment of the catalyst must be performed simultaneously with hydrogen reduction of the catalyst. Chloride treatment is carried out by adding a chlorine-containing compound to a reforming reactor while simultaneously reducing the catalyst within the reactors with hydrogen. The chlorine-containing compound employed in the chloride treatment is preferably a nonmetallic chloride. Nonmetallic chlorine-containing compounds are preferred; because, contacting the catalyst with metallic chlorine-containing compounds tends to result in the build-up on the catalyst of undesirable metals, which lead to reduced activity, reduced selectivity, or both. More preferably the chlorine-containing compound is a nonmetallic organic chloride. Organic chlorides are preferred because they tend to decompose better under activation conditions in the reformer. Preferred nonmetallic organic chlorides include, for example, tetrachloroethylene, hexachloroethane, carbon tetrachloride, 1-chlorobutane, 1-chloro-2-methyl propane, 2-chloro-2-methyl propane, tertiary butyl chloride, propylene dichloride, perchloroethylene, and mixtures of two or more thereof. The presently most preferred non-metallic chloride is perchloroethylene.

Generally, the quantity of chlorine-containing compound employed during the chloride treatment must be sufficient to add to in the catalyst system from about 0.05 to about 0.3 wt. % chlorine by weight of the total catalyst system (ie. to add about 0.0005 to about 0.0003 pounds of chlorine per pound of catalyst), preferably from about 0.1 to about 0.2 wt. % chlorine by weight of the total catalyst system (ie. to add about 0.001 to about 0.002 pounds of chlorine per pound of catalyst). The temperature employed during chloride treatment must be sufficient so as to effect decomposition of the chlorine-containing compound. The chloride treatment can be performed at a temperature of from about 500° F. to about 1,500° F., preferably from about 700° F. to about 1,200° F., and most preferably from about or 900° F. to or about 940° F., and a pressure in the range of about 0 to about 600 psig, preferably about 50 to about 300 psig.

As mentioned above, the chloride treatment must occur simultaneously with, and under the same conditions as, reduction of the catalyst with hydrogen. The quantity of hydrogen within the system during chloride treatment must be equal to the stoichiometric amount required to form hydrogen chloride with the chlorine obtained from the chlorine-containing compound. At the same time there must be a substantial absence in the system of free oxygen or compounds that decompose at the treating conditions to produce free oxygen.

In carrying out the chloride treatment of the catalyst systems, whether fresh or one to be regenerated, the selected nonmetallic chlorine-containing compound is introduced into the first reactor of the multiple reaction zone system in an amount and for a time to increase to the desired chlorine content, generally to add about 0.05 to about 0.3 weight percent, on the catalyst system of the first reactor. Thereafter, addition of the nonmetallic chlorine-containing compound is terminated to the first reactor while hydrogen flow is maintained through the first reactor. Chloride treatment is then commenced to the catalyst contained in the second reactor and continued in the manner as employed in the treatment of the first reactor until the desired chlorine content is established. Thereafter, the catalyst systems of reactor three and reactor four are serially treated in a like manner until the desired chlorine content has been established in each reactor of the series. In carrying out serially the chloride treatment of each reaction zone, hydrogen is flowed continuously through the entire multiple reaction zone system which has been so adapted to permit continuous flow of hydrogen through individual reaction zone.

Thus, there is provided a serial treatment of the multiple reaction zones with the nonmetallic chlorine-containing compound while maintaining a continuous flow of hydrogen through the entire multiple reaction zone system with such hydrogen being introduced into the first reaction zone of the multiple reaction zone system.

Following chloride treatment and reduction with hydrogen, it is essential that the system is purged with an amount of hydrogen necessary to remove excess chlorine from the catalyst. The amount of hydrogen employed during the purging process can be from about 100 to about 50,000, preferably from about 500 to about 30,000, and most preferably 1,000 to 10,000 cubic feet of hydrogen per cubic foot of catalyst. The hydrogen purge can be conducted at a temperature from about 500° F. to about 1,500° F., preferably about 800° F. to 1,100° F., and most preferably from 900° F. to 940° F., and a pressure in the range of about 0 to about 600 psig, preferably about 50 to about 300 psig.

If the hydrogen purge is conducted in a manner which exposes the catalyst to less than about 100 cubic feet of hydrogen per cubic foot of catalyst, the resulting catalyst will not meet the objects of this invention due to the existence of excessive chlorine on the catalyst. If the hydrogen purge is conducted in a manner which exposes the catalyst to more than about 50,000 cubic feet of hydrogen per cubic foot of catalyst, the resulting catalyst will not meet the objects of this invention because the catalyst will not contain sufficient chlorine.

While the above-described technique is applicable to the activation of substantially carbon-free fresh catalyst, it is particularly advantageous to incorporate such technique in a method for reactivating catalysts which have become deactivated through employment in a reforming process (i.e., a combined regeneration-reactivation procedure).

In accordance with this embodiment, the invention is directed to a method for regenerating and activating a reforming catalyst containing platinum metals that has become deactivated through a series of reforming-regeneration cycles. This method comprises first purging the deactivated catalyst with an inert gas, such as nitrogen. Then subjecting the deactivated catalyst to an oxidative burn off at a temperature and period of time sufficient to remove substantially all carbonaceous deposits therefrom. Quite commonly this oxidative burn-off is accomplished in two phases, the first of which is principally a carbon burn-off phase, while the second phase can be termed an afterburn.

In accordance with this technique, the carbon burn-off of the inventive process can be effected by contacting the carbon-containing catalyst with an oxygen-containing gas, preferably a molecular oxygen-containing gas, having a comparatively low oxygen content which is less than about 1 percent by volume, more preferably, between 0.2 and 0.8 percent by volume. The temperature employed in the carbon burn-off technique ranges from a minimum temperature necessary to effect oxygen-containing of the carbon in the presence of the oxygen-containing gas up to a maximum temperature of about 1,200° F., preferably from about 300° F. to about 850° F.

In the afterburn phase, generally a gas of a comparatively higher oxygen content is employed, e.g. up to about 2 percent by volume of oxygen. In this afterburn technique the maximum temperature employed is about 1,300° F., preferably the temperature should be from about 400° F. to about 950° F. The temperature in both the carbon burn-off and afterburn phases can readily be controlled by adjusting of the oxygen content of the oxygen-containing gas.

The catalyst resulting from the oxidative burn off should be substantially carbon free, with from 80 percent upwardly to 100 percent of the carbon originally on the catalyst being burned off. The substantially carbon free catalyst will thus generally have less than about one weight percent carbon but, more particularly, such substantially carbon free catalyst will contain carbon in the range of from about 0.01 weight percent to about 0.75 weight percent, but, preferably, from 0.01 to 0.25 weight percent. Most preferably, the carbon content will be less than 0.15 weight percent, thus, from 0.01 to 0.15 weight percent. Generally, the oxidative burn off should be performed from about 4 to about 36 hours, preferably from 8 to 18 hours.

After the oxidative burn off, the substantially-carbon-free catalyst is subjected to an oxygen treatment with a gas containing at least about 5 percent by volume of molecular oxygen at a temperature in the range of from about 800° F. to about 1,150° F., preferably from about 900° F. to about 940° F. In this oxygen treatment step of the invention, any suitable oxygen-containing gas can be employed including, for example, air or air diluted with an inert gas such a nitrogen. Preferably the oxygen-containing gas will be comprised of from about 5 to about 15 percent by volume of molecular oxygen. The duration of the oxygen treatment can be quite brief or can be extended for a period of a few days. Generally, such treatment is for a period of from about 4 hours to 36 hours.

While it is not necessary to employ superatmospheric pressures in the oxygen treatment step, it is usually convenient to do so. Thus, total pressures up to about 300 psig can be employed although normally the total pressure is maintained at a level below 100 psig. Preferably such treatment is carried out at a pressure in the range of about 25 to about 60 psig.

After the oxygen treatment step, the catalyst is purged of molecular oxygen. The purging can be conducted by any of the techniques well known in the art such as, for example, by flowing an inert gas such as nitrogen through the catalyst.

After being purged of molecular oxygen, or simultaneously therewith, the catalyst is cooled to a temperature in the range of about 600° F. to about 1,000° F., preferably about 800° F. to about 840° F.

After the catalyst has been freed of molecular oxygen and cooled, it is then activated in substantially the same manner as described previously. As described in detail above, activation is accomplished by simultaneously reducing the catalyst with hydrogen and serially contacting the catalyst in each reactor with a chlorine-containing compound, and thereafter purging the catalyst with hydrogen.

The following examples are intended to be illustrative of the present invention and to teach one of ordinary skill in the art to make and use the invention. These examples are not intended to limit the invention in any way.

EXAMPLE I

Control

A commercial reforming multiple reactor system of the size as noted below was charged with a selected alumina supported catalyst system as follows:

| Reactor | Catalyst | | Charge (lbs) |
|---|---|---|---|
| 1 | 0.3 wt % Pt<br>1.5 wt % Ge | (1) | 24,294 |
| 2 | 0.3 wt % Pt<br>1.5 wt % Ge | (1) | 24,294 |
| 3 | 0.25 wt % Pt<br>0.24 wt % Rh | (2) | 25,305 |
| 4 | 0.25 wt % Pt<br>0.24 wt % Rh | (2) | 55,860 |

(1)UOP R-72
(2)UOP R-56 so as to provide a total catalyst system of 129,753 pounds.

Each reactor of the system was a conventional reforming reactor having a configuration commonly known as a semi regeneration unit. The charged catalyst was disposed in each reactor so as to provide radial flow of feed.

The dimensions of the reactor system was as follows:

| Reactor | Height | Internal Diameter |
|---|---|---|
| 1 | 30 ft tan/tan | 5 ft 6 inches |

-continued

| Reactor | Height | Internal Diameter |
|---------|--------|-------------------|
| 2 | 30 ft tan/tan | 5 ft 6 inches |
| 3 | 30 ft tan/tan | 5 ft 6 inches |
| 4 | 30 ft tan/tan | 7 ft 10 inches |

A heater unit was associated with each reactor of the series so as to provide a feed having a temperature in the range of about 900° F. to about 970° F.

Activation was achieved by introduction of perchloroethylene (PCE) only into reactor one with the added PCE being allowed to flow through reactors 2, 3 and 4. The PCE charge was continued to reactor 1 until chlorine was detected in the effluent of reactor 4. Thereafter the entire system was purged at 900° F. and a pressure of 200 psig with hydrogen for a period of 2 hours.

Following conclusion of the purging, a feed hydrocarbon was introduced into the system at 800° F. with hydrogen and feed commenced at a liquid space velocity of 2–2.5 hr$^{-1}$ with a hydrogen:hydrocarbon ratio of 4 and a pressure of 300 psig with a gradual temperature increase to 920° F.

The feed had an initial octane value of 78.4 and consisted of 19.3% n-paraffin, 30.7% iso-paraffin, 23.5% naphthenes, 25.7% aromatics, 0.2% olefins and 0.6% unknowns.

The feed had an initial boiling point of 176° F. and an end point of 385° F. and an average molecular weight of 113.

After continuous operation of the system for a period of 4 months, the following results were obtained:

| Octane | Total Barrels | Coke (Reactor 4) Wt % of Catalyst |
|--------|---------------|-----------------------------------|
| 97.03 | 2.1 million | 8.13 |

With a charge of 2.1 million barrels of feed to get an octane value of 97.03 for product, coke on the catalyst of reactor 4 was 8.13 weight percent. Therefore, the formation of coke was 49 pounds of coke per million barrels per octane value.

The above results show that the activated system as achieved through introduction of PCE only into Reactor 1 provided a system having a limited operating time prior to requiring regeneration and reactivation.

EXAMPLE II

Invention

To illustrate the benefits of the activation process of the present invention to the reactor series as employed in Example I, the charged catalyst was activated by reduction with hydrogen at 900° F. and then the system was serially treated with perchloroethylene (PCE) to increase the chlorine content to about 0.2 weight percent in each reactor.

Following PCE treatment of reactor 4, the entire reactor system was purged with hydrogen for a period of 2 hours at a temperature of about 900° F. and a pressure of about 200 psig.

Following completion of the purge, the multi reactor system was cooled to 800° F. with hydrogen and feed commenced at a liquid space velocity of 2–2.5 hr$^{-1}$ (LHSV) with a hydrogen:hydrocarbon ratio of 4 and a pressure of 300 psig with a gradual temperature increase to 920° F.

The feed employed was the same as used in Example I.

After continuous operation of the reaction system for a period of 7 months, the following results were obtained.

| Octane | Total Barrels | Coke (Reactor 4) Wt % of Catalyst |
|--------|---------------|-----------------------------------|
| 99.4 | 6.1 million | 19.50 |

With a charge of 6.1 million barrels of feed to get an octane value of 99.4 for product, coke on the catalyst of reactor 4 was 19.50 weight percent. Therefore, the coke formation by the present invention is 42 pounds of coke per million barrels per octane value.

The above data show that activation in accordance with the process of the present invention provided a low coking environment which provides for a longer operating time with identical octane and feed rate or a higher octane and higher throughput for the same run life.

In addition, the activating process provides a reduced rate of accumulation of coke on the catalyst by 14.30 percent as compared to the control (Example I).

EXAMPLE III

Invention

To further illustrate the process of the present invention, the reactor system as employed in Example I was operated for a period of four months using a feed of the type employed in Example I as well as carrying out the reforming operation under similar conditions.

At the end of the four month period of operation, the following results were obtained:

| Octane | Total Barrels | Coke (Reactor 4) Wt % of Catalyst |
|--------|---------------|-----------------------------------|
| 98.9 | 3.6 million | 11.83 |

With a charge of 3.6 million barrels of feed to get an octane value of 98.9 for product, coke on the catalyst of reactor 4 was 11.83 weight percent.

Therefore the coke formation by the present invention was 44 pounds of coke per million barrels per octane value. The above date show that activation in accordance with the process of the present invention provided a low coking environment which provides for a longer operating time with identical octane and feed rate or a higher throughput for the same run life.

In addition, the activation process provided a reduced rate of accumulation of coke on the catalyst by 10.20 percent compared to the control (Example I).

The specific examples herein disclosed are to be considered as being primarily illustrative. Various changes beyond those described will no doubt occur to those skilled in the art; and such changes are to be understood as forming a part of this invention insofar as they fall within the spirit and scope of the appended claims.

That which is claimed is:

1. A process for activating a platinum-containing reforming catalyst contained in a multiple reaction zone system, said process comprises:

(a) reducing said platinum-containing reforming catalyst with hydrogen by continuously flowing a hydrogen gas stream successively through each reaction zone in said multiple reaction zone system;

(b) simultaneously with step (a) contacting said platinum-containing reforming catalyst with a nonmetallic chlorine-containing compound by introducing said nonmetallic chlorine-containing compound serially into each reaction zone of said multiple reaction zone system under conditions to effect decomposition of said nonmetallic chlorine-containing compound thereby providing a chlorine-treated catalyst; and (c) thereafter purging said chlorine-treated catalyst with about 100 to about 50,000 cubic feet of hydrogen per cubic foot of said chlorine-treated catalyst prior to using said chlorine-treated catalyst in a reforming process.

2. A process according to claim 1 wherein said contacting is carried out at a temperature in the range of about 700° F. to about 1,200° F. and a pressure in the range of about 0 to about 600 psig.

3. A process according to claim 2 wherein said purging is carried out at a temperature in the range of about 800° F. to about 1,100° F. and a pressure in the range of about 0 to about 600 psig.

4. A process according to claim 1 wherein said nonmetallic chlorine-containing compound is added to said platinum-containing reforming catalyst in an amount sufficient to add from about 0.05 to about 0.3 wt. % of chlorine to said platinum-containing reforming catalyst.

5. A process according to claim 4 wherein said nonmetallic chlorine-containing compound is selected from the group consisting of tetrachloroethylene, hexachlorethane, carbon tetrachloride, 1-chlorobutane, 1-chloro-2-methyl propane, 2-chloro-2-methyl propane, tertiary butyl chloride, propylene dichloride, perchloroethylene, and mixtures of two or more thereof.

6. A process according to claim 5 wherein said nonmetallic chlorine-containing compound is perchloroethylene.

7. A process according to claim 1 wherein the introduction of said non-metallic chlorine-containing compound into a reaction zone is terminated to that reaction zone before commencing the introduction of said non-metallic chlorine-containing compound into the next reaction zone in said multiple reaction zone system.

* * * * *